(12) United States Patent
Laflamme et al.

(10) Patent No.: US 8,384,398 B2
(45) Date of Patent: Feb. 26, 2013

(54) STRUCTURAL HEALTH MONITORING SYSTEM AND METHOD USING SOFT CAPACITIVE SENSING MATERIALS

(75) Inventors: Simon Laflamme, Cambridge, MA (US); Matthias Kollosche, Potsdam (DE); Guggi Heine Remme Kofod, Berlin (DE)

(73) Assignee: Massachusetts Institute of Technology, Cambridge, MA (US)

( * ) Notice: Subject to any disclaimer, the term of this patent is extended or adjusted under 35 U.S.C. 154(b) by 420 days.

(21) Appl. No.: 12/751,488

(22) Filed: Mar. 31, 2010

(65) Prior Publication Data
US 2011/0241704 A1 Oct. 6, 2011

(51) Int. Cl.
*G01R 27/26* (2006.01)

(52) U.S. Cl. .......... 324/663; 324/658; 324/661

(58) Field of Classification Search .......... None
See application file for complete search history.

(56) References Cited

U.S. PATENT DOCUMENTS

| | | | | |
|---|---|---|---|---|
| 4,098,000 | A | * | 7/1978 | Egger ............ 33/788 |
| 5,602,486 | A | * | 2/1997 | Novak ............ 324/671 |
| 6,809,462 | B2 | | 10/2004 | Pelrine et al. |
| 6,969,941 | B1 | | 11/2005 | Kapps et al. |
| 7,199,501 | B2 | | 4/2007 | Pei et al. |

OTHER PUBLICATIONS

Song, G., Gu, H., Mo, Y., Hsu, T., & Dhonde, H., (2007). *Concrete Structural Health Monitoring Using Embedded Piezoceramic Transducers*. Smart Materials and Structures, 16, 959-968.

Straser, E., & Kiremidjian, A. (1998). *A Modular, Wireless Damage Monitoring System for Structures*. The John A. Blume Earthquake Engineering Center.

Gian Bartolo Picotto, Marco Pisani and Andrea Sosso, "A multi-electrode plane capacitive sensor for displacement measurements and attitude controls, "Meas. Sci. Technol. 2009.

Shkel, Y.M., "Electrostriction Enhancement of Solid-State," IEEE/ASME Transactions on Mechatronics, vol. 8, No. 3, 2003H. S. Nalwa, Ed., *Handbook of Low and High Dielectric Constant Materials and Their Applications*, vol. 2, (Academic Press, New York, 1999).

Baojin, C., Zhou, X., Ren, K., Neese, B., Lin, M., Wang, Q., Bauer, F., Zhang, Q. M., "*A Dielectric Polymer with High Electric Energy Density and Fast Discharge Speed*," Science, Jul. 21, 2006.

Rao, Y., Ogitani, S., Kohl, P., Wong, C.P., "*High dielectric constant polymer-ceramic composite for embedded capacitor application*" Advanced packaging Materials: Processes, Properties and Interfaces, 2000.

Gu, H., Jin, P., Zhao, Y., Lloyd, G.M., and Wang, M.L. Design and Experimental Validation of a Wireless PVDF Displacement Sensor for Structure Monitoring. Proc. SPIE Nondestructive Detection and Measurement for Homeland Security II, 5395, 91-99, (2004).

(Continued)

*Primary Examiner* — Minh N Tang
(74) *Attorney, Agent, or Firm* — Preti Flaherty Beliveau & Pachios LLP

(57) ABSTRACT

A structural health monitoring system is provided to diagnose and localize crack damage on structural elements. The system uses one or more capacitive sensor assemblies that employ a soft dielectric material. The system can be applied over a large area as a sensing skin, allowing the presence of cracks to be localized.

17 Claims, 10 Drawing Sheets

OTHER PUBLICATIONS

Jia, Y., & Sun, K. (2006). Thick film wireless and powerless strain sensor. Proc. SPIE, 6174, 6174OZ 1-11.

Lin, B., Giurgiutiu, V., Bhalla, A.S., Chen, C., Guo, R., & Jiang, J. (2009). Thin-Film Active Nano-PWAS for Structural Health Monitoring. Proc. SPIE Sensors and Smart Structures Technologies for Civil, Mechanical, and Aerospace Systems, 7292, 1-11.

Lin, B., Giurgiutiu, V., Yuan, Z., Liu, J., Chen, C., Jiang, J., et al. (2007). Ferroelectric Thin-Film Active Sensors for Structural Health Monitoring. Proc. Of SPIE, 6529, 1-8.

Zhang, Y. (2005). Piezoelectric Paint Sensor for Real-Time Structural Health Monitoring. Proc. of SPIE, 1095-1103.

* cited by examiner

STRUCTURAL HEALTH MONITORING SYSTEM AND METHOD USING SOFT CAPACITIVE SENSING MATERIALS

STATEMENT REGARDING FEDERALLY SPONSORED RESEARCH OR DEVELOPMENT

N/A

BACKGROUND OF THE INVENTION

The monitoring of civil structures and infrastructure has traditionally been done, and is still commonly done, by visual inspection, which can be costly and time consuming. Recent structural failures and the degrading state of the civil infrastructure highlight the importance of monitoring and preserving structural integrity to ensure public safety. The field of structural health monitoring has placed particular emphasis on the non-destructive evaluation of buildings and infrastructure, and a variety of non-destructive testing techniques have been developed, such as pulse-echo, dynamic response, and acoustic emission techniques. For example, acceleration-based measurement techniques are widely used to evaluate a structure's vibration signature.

Strain-based measurement techniques are also widely used. Commonly, strain measurements employ resistive foil gauges or optical fibers. Smart memory alloys and piezoelectric materials can also be employed in strain measurement techniques. Piezoelectric transducers are typically embedded in the structure, and generally fall into three categories: acoustic emission, acoustic-ultrasonic and electromechanical impedance. Electroactive piezoceramics and piezopolymers have been employed in these techniques. Piezoelectric paints that contain piezoelectric particles have also been developed.

SUMMARY OF THE INVENTION

The present invention relates to a structural health monitoring (SHM) system to detect and localize structural damage in the form of cracks in structural elements. The SHM system uses one or more capacitive sensor assemblies that employ a soft dielectric material that, when deformed, produces a measurable change in capacitance. The sensor assemblies are regularly monitored for any change in the static structural state, allowing for the accurate detection and measurement of cracks occurring due to deformation, aging, or other structural failures, particularly in materials such as concrete. The SHM system can be applied over a large area as a sensing skin, which allows the presence of cracks to be localized. The soft dielectric material can be in the form of a sheet with a plurality of capacitive sensor assemblies formed on the sheet.

In one embodiment, one or more capacitive sensor assemblies are deployed in an absolute sensing mode. In another embodiment, the system employs one or more sense capacitors and one or more reference capacitors in a differential sensing mode. Sense and reference capacitors can be provided in a laminated structure or separately.

The system can be used with civil structures and infrastructure, such as buildings, bridges, tunnels, and dams. Other structures can also be monitored with the present SHM system, such as pipelines, aircraft, ships, scaffolds, blimps, space structures, and surface transportation vehicles such as trains and trucks. The system can be used on a variety of materials, and particularly on concrete and steel, including corroded steel.

DESCRIPTION OF THE DRAWINGS

The invention will be more fully understood from the following detailed description taken in conjunction with the accompanying drawings in which.

DETAILED DESCRIPTION OF THE INVENTION

Figure 1A:
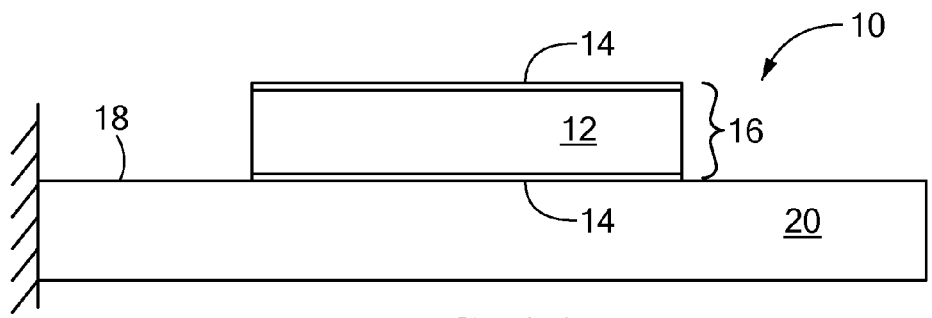
FIG. 1A schematically illustrates a soft capacitive sensor assembly attached to a structural element in a structural health monitoring system (in which the sensor is greatly enlarged with respect to the structural element and not to scale)
Figure 1B:
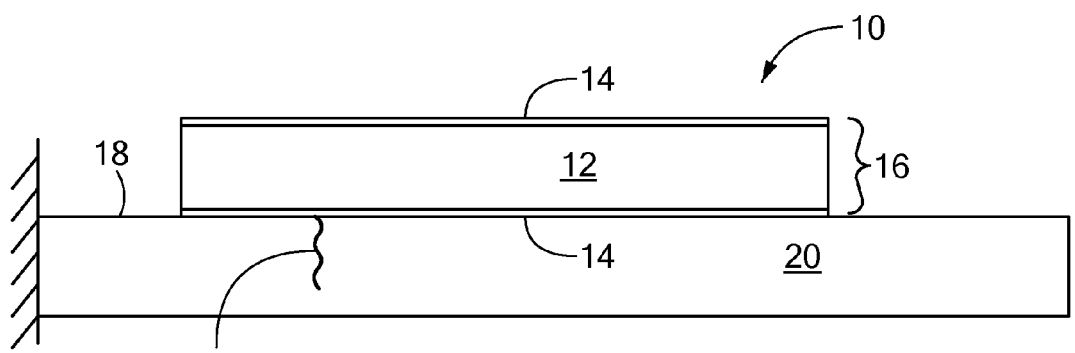
FIG. 1B schematically illustrates the capacitive sensor assembly of FIG. 1A indicating a change in strain state of the structural element.

Deformations of structural elements can lead to the formation of cracks in the structural elements. A structural health monitoring (SHM) system is provided that is able to monitor such crack formation in structural elements. The SHM system employs a capacitive sensor assembly 10, illustrated schematically in FIGS. 1A and 1B, that has a layer of a soft dielectric material 12 disposed between electrodes 14 in a layered structure, forming a capacitor 16. The capacitor 16 is deployed on the surface 18 of a structural element 20. (For clarity in FIGS. 1A and 1B, the layered structure of the dielectric material 12 and electrodes 14 is not to scale and is greatly enlarged compared to the structural element 20.) The formation of a crack 24 in the structural element (FIG. 1B), strains or deforms the soft dielectric material 12, producing a measurable change in capacitance.

A suitable soft dielectric material 12 for use in the present SHM system is generally characterized by a large strain, low modulus of elasticity, and high compliance. In one embodiment, the dielectric material is a dielectric electroactive polymer (DEAP) material, such as a silicone elastomer. The DEAP material is sufficiently sensitive to an applied strain to cause a large and measurable change in the capacitance of the DEAP. For example, one suitable DEAP material is a film of a polydimethylsiloxane, with a Young's modulus of 1.1 MPa and a dielectric constant of around 3.1. The film thickness is around 39 μm. Other soft dielectric materials can be used while accounting for their variation of mechanical properties. Suitable soft materials can include gels, waxes, elastomers, or polymers, with or without additives such as plasticizers, dipoles, chemical compounds, chemical grafts, copolymers, oils, branched polymers, or colloids, etc. Blends of such materials can be used. Blends can include other components, such as a high boiling solvent or coated or uncoated particles, including nanoparticles.

The electrodes 14 in the layered structure 20 are formed of a suitable conductive material and are formed or configured to operate in conjunction with the compliancy of the soft dielectric material 12. The compliancy of the electrodes may be provided by the electrode material or the structure of the electrodes, or both. For example, the electrodes can be structured as corrugated sheets, zig-zag strips, or a pattern of links and nodes, or a combination of such electrode structures can be used. In one embodiment of structured electrodes, the compliancy of the electrodes may be provided by forming the dielectric layer with a corrugated surface. The electrodes are deposited as a thin film of a conductive metal, such as silver having a thickness of ≈50 nm, over the corrugated surface. The resulting corrugated layered structure has an increased stiffness in the direction parallel to the corrugations and constrains elongation of the dielectric to the direction orthogonal to the corrugations. Thus, the corrugated electrodes are capable of accommodating deformation of the dielectric material. A suitable dielectric material with compliant electrodes is commercially available as a corrugated metalized film from Danfoss PolyPower A/S of Denmark.

Other suitable electrode materials include composite materials having a soft matrix material with conductive or semiconductive particles. The matrix may be, for example, an oil, wax, gel, elastomer, polymer, or ionic liquid. The conductive filler may be, for example, carbon black particles, graphite particles, exfoliated graphite, carbon nanotubes (multiwalls or single walls), metal particles, or conductive polymer particles. The particles may have a surface treatment. The matrices and the filler materials may be chemically linked to each other. Blends of insulating and conducting polymers and elastomers may be used.

The capacitor 16 is adhered to the surface 18 of the structural element 20. The capacitor is generally stretched slightly in tension during adherence to ensure that it will strain upon formation of a crack. The surface of the structural element may be sanded and/or primed if necessary with a suitable primer (for clarity, not shown in FIGS. 1A and 1B) to fill in surface pores and provide a more even surface, for example, if the structural element is concrete. Any suitable primer can be used, such as Behr Concrete Bonding Primer available from Home Depot. The capacitor is adhered to the primed surface with a suitable adhesive (for clarity, not shown in FIGS. 1A and 1B). For example, a commercial off the shelf liquid epoxy adhesive, which provides a minimally thick adhesive layer, can be used. The liquid epoxy provides a strong bond to the surface and does not affect the compliancy of the dielectric material. For static measurements, shear lag induced by bonding is not of consequence.

One or more soft dielectric capacitive sensor assemblies 10 can be deployed in an absolute capacitive sensing mode for static structural health monitoring. In this mode, the capacitance of each soft dielectric capacitor is monitored directly. The capacitance signal can be correlated with beam deformation before cracking and during cracking. Thus, a change in capacitance can be correlated with the development of a crack 24. See FIG. 1B. A plurality of capacitive sensor assemblies 10 can be deployed to cover a large area of the structural element, thus increasing the accuracy of determining the locations of cracks. The sensor assemblies can be strategically placed to account for particular stresses or deformations of interest. For example, if flexural cracking of a simply supported beam is of interest, one or more sensors can be installed on the bottom surface in the middle of the span of the beam.

Figure 2:
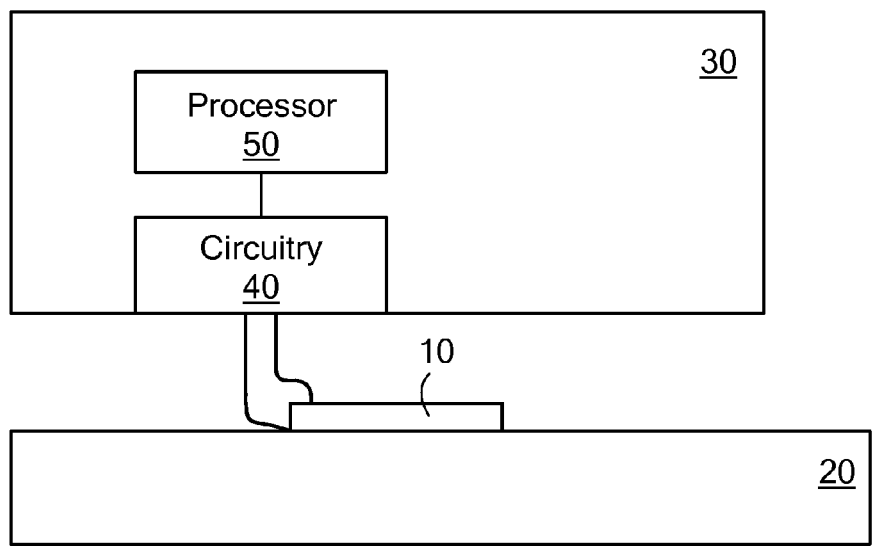
FIG. 2 schematically illustrates the capacitive sensor assembly of FIG. 1A in communication with a measuring system.

The capacitive sensor assemblies 10 are in communication with a suitable measuring system 30, indicated schematically in FIG. 2. The measuring system 30 includes suitable electronic circuitry 40, for example, with an LCR unit, in electrical communication with the electrodes 14 of the sensor assembly 10 for measuring the voltage difference. Using the circuitry 30, the voltage difference signals are converted to digital signals. The digital signals are transmitted to a processor 50, which is suitably programmed to determine the presence and location of cracks in the structural element 20. See FIG. 2. The measuring system 30 for measuring the change in capacitance and determining the state of cracks in the structural element can advantageously operate with low electrical power consumption. Signals can be transmitted via wire or wirelessly.

Figure 3:
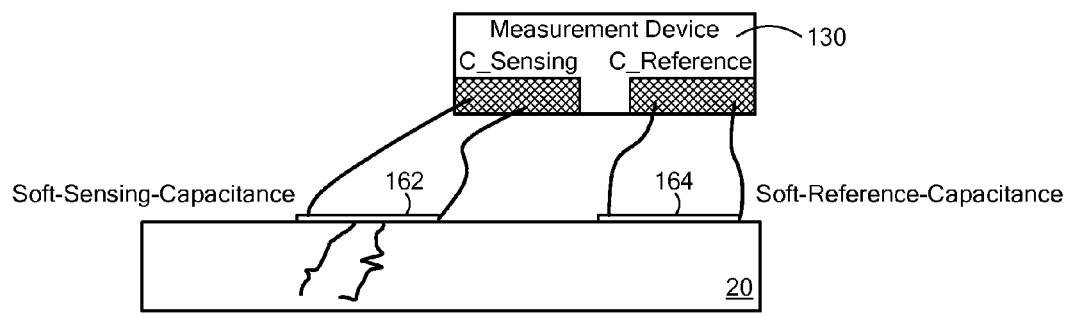
FIG. 3 schematically illustrates a capacitive sensor assembly in a differential mode.

The soft dielectric capacitive sensor assemblies can also be deployed in a differential or comparative capacitive sensing mode, which provides increased sensitivity to changes in capacitance. In this mode, the capacitances of two capacitive sensors are monitored and compared. One capacitive sensor forms a sensing capacitor 162, and another capacitive sensor forms a reference capacitor 164. (See, for example, FIG. 3.) A change in capacitance of the sensing capacitor 162 can be compared to the capacitance of the reference capacitor 164 in a suitable measuring system 130. In this mode, accuracy can be improved by several orders of magnitude and the system can compensate for various types of drift, for example, from environmental effects.

Figure 4:
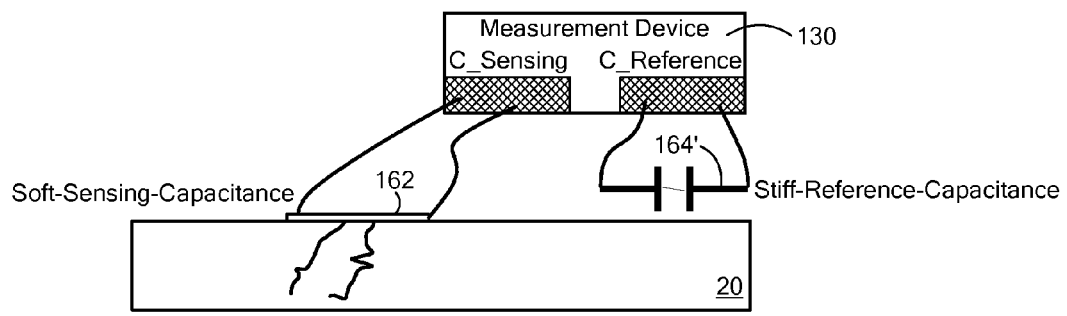
FIG. 4 schematically illustrates further embodiment of a capacitive sensor assembly in a differential mode.

In one embodiment of the differential mode, two soft dielectric capacitive sensors 162, 164 are disposed at separate locations on the structural element 20. See FIG. 3. Any number of capacitive sensor assemblies can be deployed to cover a large area of the structural element, to increase the likelihood of localizing any cracks. One reference capacitor may be used with multiple sensing capacitors. In another embodiment, the reference capacitor 164' is not disposed on the structural element. See FIG. 4. In this case, different dielectric materials can be used for the reference and sense capacitors; however, the reference and sense capacitors preferably use the same dielectric material to obviate temperature drift issues.

Figure 5:
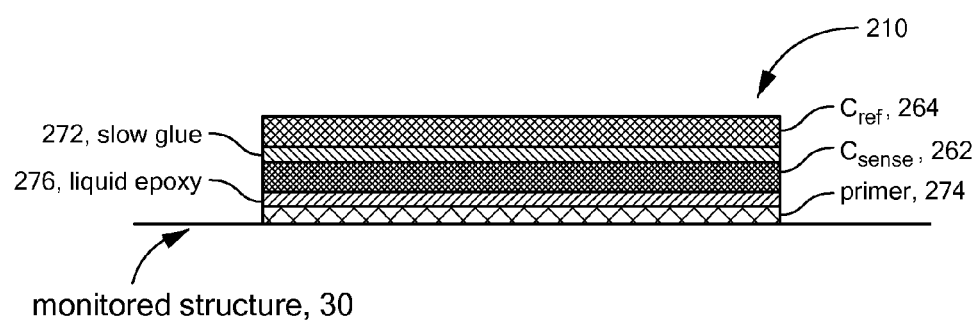
FIG. 5 schematically illustrates a further embodiment of a capacitive sensor assembly in a differential mode.

In another embodiment of the differential mode, the sensing capacitor 262 and the reference capacitor 264 of the capacitive sensor assembly 210 are incorporated into a unitary, layered structure. See FIG. 5. (For clarity due to their thinness relative to the dielectric film, the electrodes are not shown separately from the dielectric film in each sensor in FIG. 5.) The two soft dielectric capacitive sensors 262, 264 are laminated to each other with a soft, slow glue layer 272. The glue should have a slow visco-elastic behavior, so that it transmits mechanical impact with a delay and has no adverse effect on the sensor's compliancy. Suitable slow glues can be comprised of a gel, a wax, a soft elastomer, a polymer, or a blend of any or all of these materials, with or without other additives. A blend that includes one of these materials and another component, such as a high-boiling solvent or nanoparticles, coated or uncoated, can be used. The assembly is attached to a structural element as discussed above, sanding the surface if necessary, and using a primer layer 274 as needed to fill in surface pores and provide a more even surface on the structural element. A suitable adhesive layer 276, such as a liquid epoxy adhesive, is used to provide a minimally thick adhesive layer. In FIG. 5, the lower sensor forms the sensing capacitor 262, and the upper sensor forms the reference capacitor 264; this order can be reversed.

Figure 6:
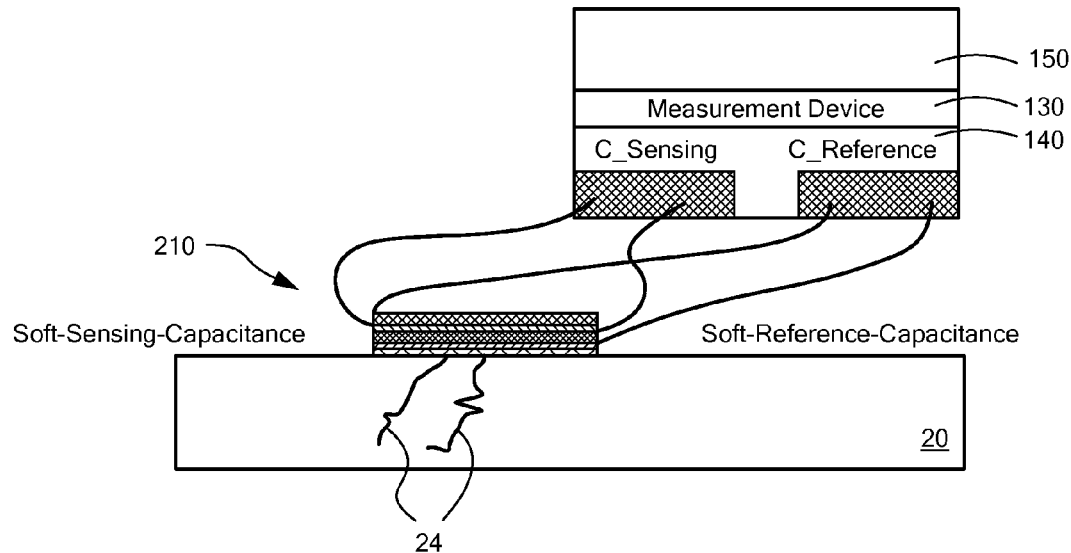
FIG. 6 schematically illustrates the capacitive sensor assembly of FIG. 5 in communication with a measuring system.

The capacitive sensor assembly 210 is in communication with a suitable measuring system 130. See FIG. 6. The measuring system includes circuitry 140 to measure the capacitive changes at the sense capacitor, convert the measured voltage differences into digital signals, and transmit the signals to a suitable processor 150. The circuitry 140 may include, for example, an oscillating circuit, and the measurement of the change in capacitances of the sense and reference capacitors is carried out by applying an oscillating low voltage to the capacitors, and comparing the electrical response with the input signal. The comparison yields information about the actual capacitance of the dielectric material, as well as the electrical loss. The system 130 includes storage, a clock, and a converter, such as a time to digital converter or an analog to digital converter, to convert the measured voltage differences into digital signals for transmission to a suitable processor. A temperature sensor and appropriate circuitry can be included to compensate for temperature changes. A high repetition rate allows a detailed analysis to determine the source of the change, which can be due to a loss of stiffness or a more benign increase in mass. The measuring system can generally employ commercially available strain gauge circuitry. For example, PICOSTRAIN® PS021 on-chip circuitry available from ACAM is suitable.

The processor 50, 150 can be suitably programmed to compare a present measure of capacitance with past measures of capacitance to detect significant changes over time. Capacitance measurements are preferably compared from two different times when the differential load is known to be small, such as, for a bridge, when no vehicles are present. If desired, one or more accelerometers can be used to determined when accelerations are low, and capacitance measurements can be sampled at those times.

As noted above, the SHM system can be used to monitor large surface areas of structural elements using an array of multiple sensors as a sensing skin. The sensors of the skin can be measured and compared in various combinations, to allow for more accurate and/or adaptive structural damage localization.

Figure 7:
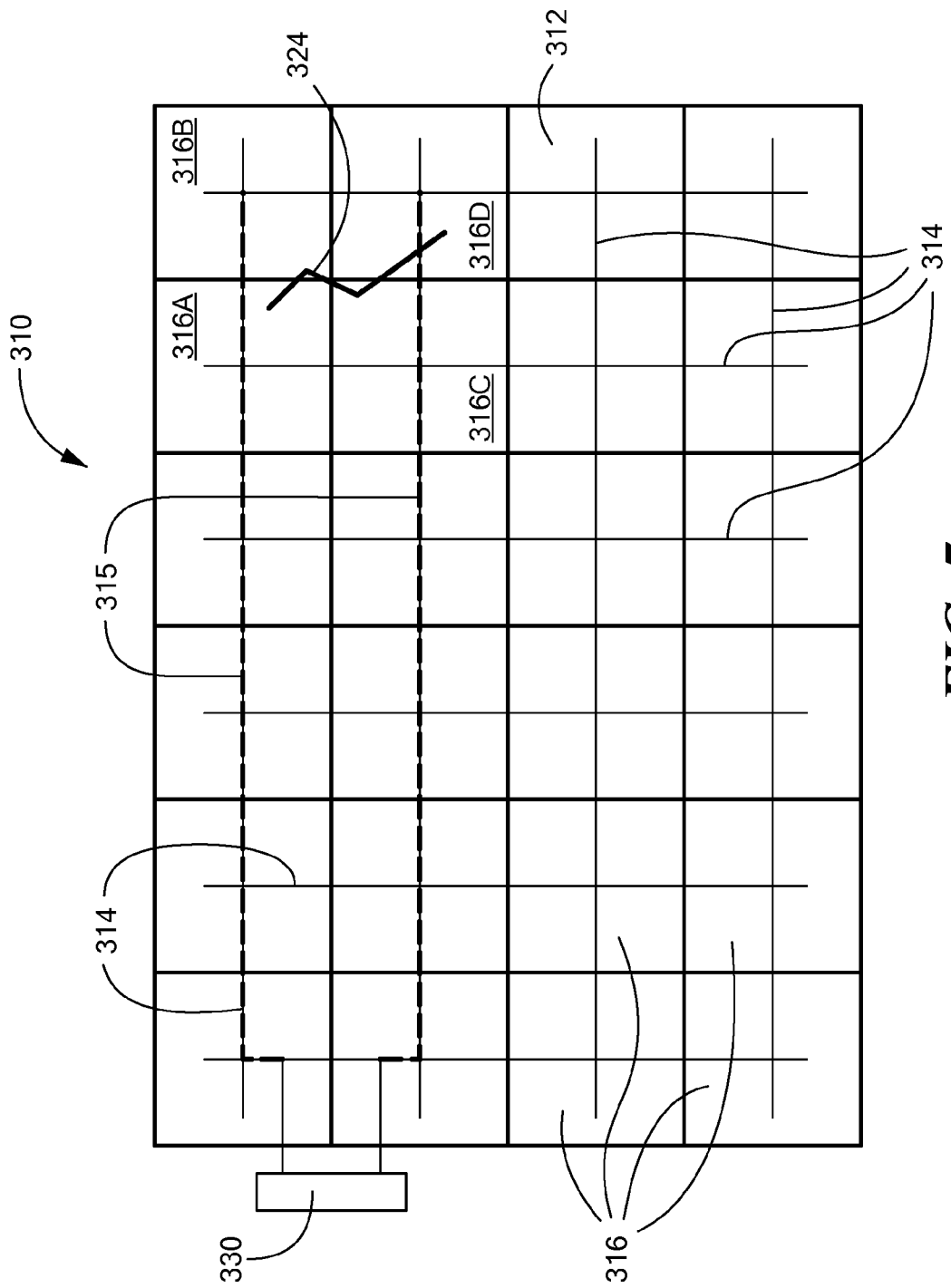
FIG. 7 schematically illustrates a sensing skin employing soft capacitive sensor assemblies.

In one embodiment of a sensing skin 310, the soft dielectric material can be provided in the form of a sheet 312. See FIG. 7. The sheet can be configured to cover any desired area of the structural element, which may be irregular. Electrodes are disposed on opposed sides of the dielectric sheet at any desired locations. For example, conductive metal traces 314 can be deposited on the sheet to electrically connect the electrodes to the measurement system. In this manner, a sensing skin can be formed on a structural element of any size or shape. In FIG. 7, the sheet 312 is formed into a 4×6 array of twenty-four sensors 316, with conductive traces 314 linking each sensor to a measurement system 330. (For clarity, the measurement system 330 is illustrated in communication with only some of the traces 314, illustrated by dashed lines 315.) The processor 150 can be suitably programmed to localize a crack by determining which sensors are providing the significant change in capacitance. For example, referring to FIG. 7, a crack 324 can be localized to sensors 316A, 316B, 316C, and 316C. Any number of sensors can be provided on a sheet. Also, the sheet can include layers of soft dielectric material laminated to provide sense and reference capacitors, as described in conjunction with FIG. 5.

In an alternative embodiment, a sensing skin can be achieved by a multitude of discrete sensors arranged in a large array or matrix over a structural surface. The number and pattern of the sensors can be selected based on the structural element to be monitored. The pattern of sensors can be irregular to adapt to the particular structural element. The sensors can be strategically placed to account for particular stresses or deformations of interest, as discussed above.

The sensing system can also be used for dynamic monitoring of vibration signatures if desired, by monitoring the frequency response spectrum of the sensor. This would allow for monitoring of global health diagnosis, as opposed to local diagnosis. A sensor can be employed in both modes, local or global, at different, perhaps alternating, times, to reduce costs and maintenance. A sufficiently strong bond with the surface of the structural element is needed for such dynamic monitoring.

Tests performed on concrete beams show that capacitive sensor assemblies as described herein are sensitive to strains induced by flexural cracks, and are capable of detecting localized micro-fractures over the beam area covered by the sensor assemblies. In the tests, a capacitive sensor assembly was attached to a surface of concrete or mortar beam specimens. The specimens were subjected to a periodic four-point loading to induce flexural cracks. Loading and displacement rates were plotted against the capacitance measurements over time. A jump in loading and displacement rate indicated the formation of a crack. The cracks were also observed visually. A significant change in the capacitance measurements correlated with the appearance and widening of the cracks.

In another embodiment, liquid crystals can be embedded in the dielectric material, and a local mechanical stress can result in a change in optical properties, such as the color of the system. More particularly, polymer-dispersed liquid crystals (PDLCs) are composite materials comprised of micrometer-sized liquid-crystal (LC) droplets embedded in a polymer matrix. The application of mechanical stress leads to changes in the transmittance of the PDLC film. For example, PDLC films have been prepared from a nematic LC (for example, MDA-03-1767, available from Merck Chemicals, Germany). Thus, a visual indication of a crack can be provided by, for example, noting which area has changed color. Such an optical system can provide a supplement to the system described above.

The capacitive sensor assemblies can employ a dielectric material with self-healing properties, which can be beneficial if the capacitive sensor assemblies are exposed to an outside environment. For example, the sensor assemblies may be attached to large-scale structures such as bridges, where they could be damaged by harsh weather (for example, hail), animals (for example, birds), or vandalism. The material can recover from damage by, for example, inducing a high voltage, which burns the damaged or contaminated regions and restores the functionality of the system.

Test 1

Figure 8:
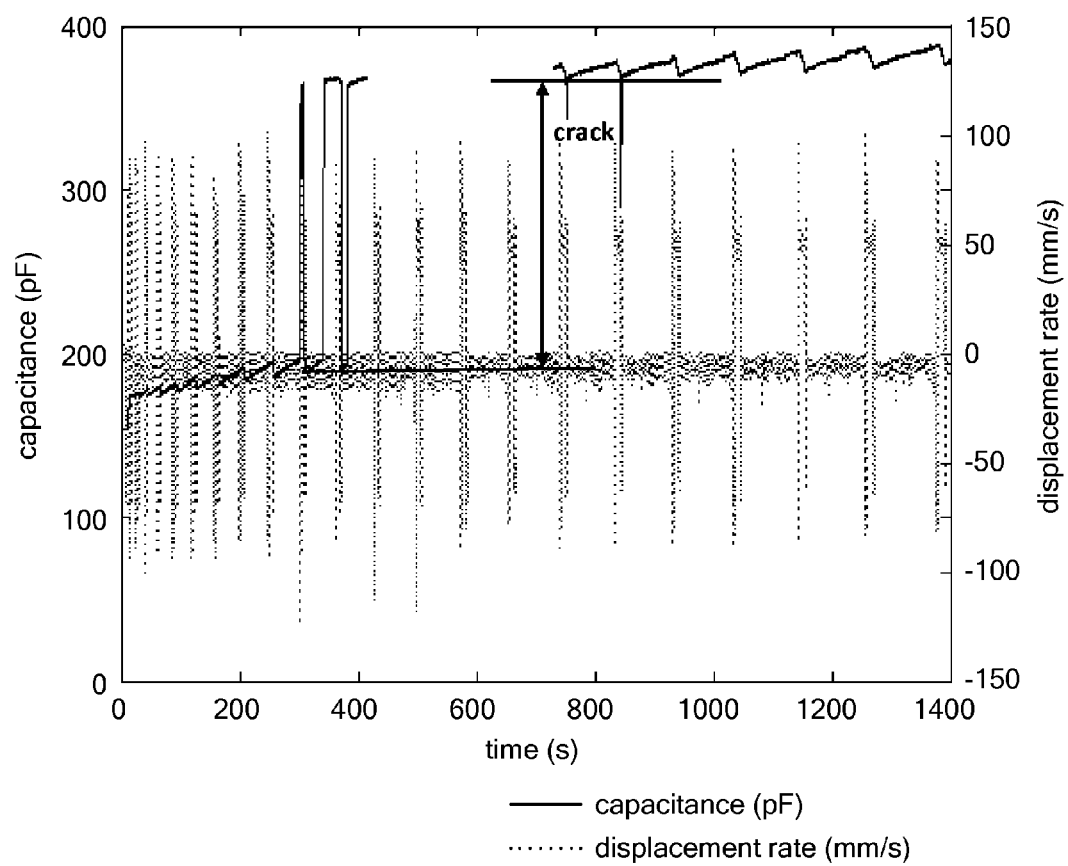
FIG. 8 is a graph of capacitance vs. time and displacement rate vs. time in a first test of a capacitive sensor assembly.
Figure 9:
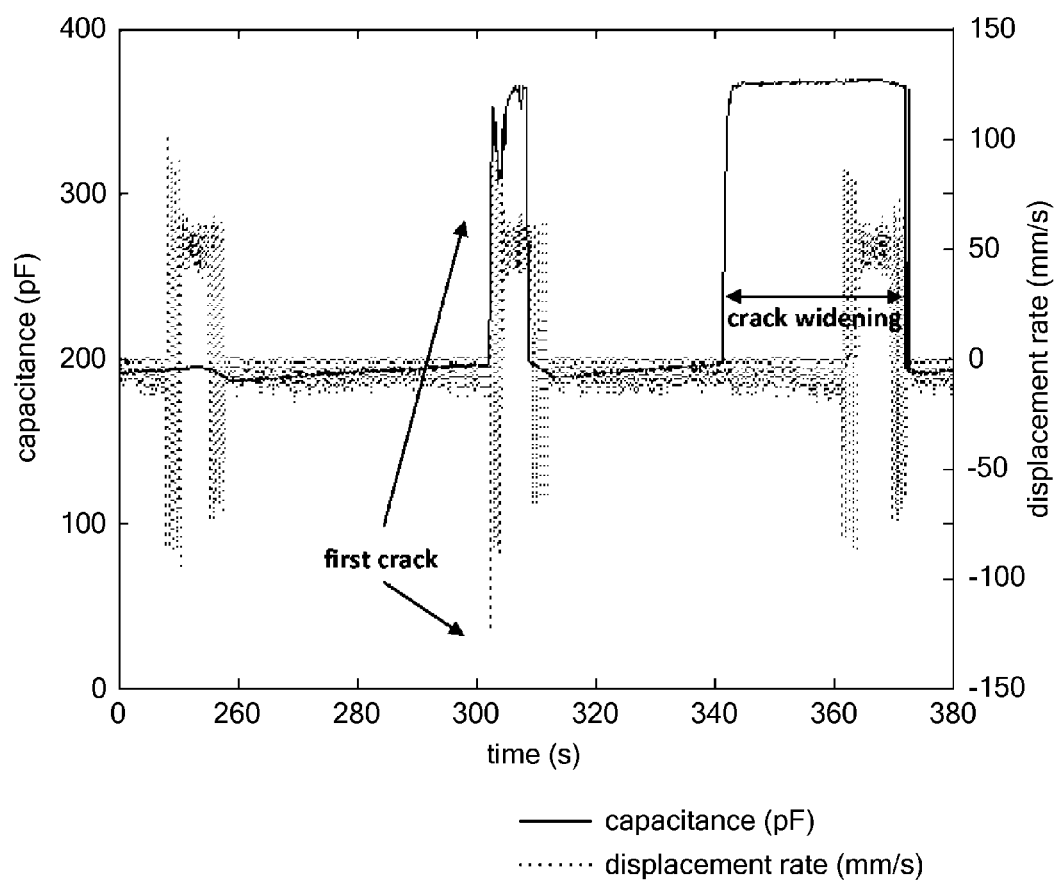
FIG. 9 is an enlargement of a portion of the graph of FIG. 8.
Figure 10:
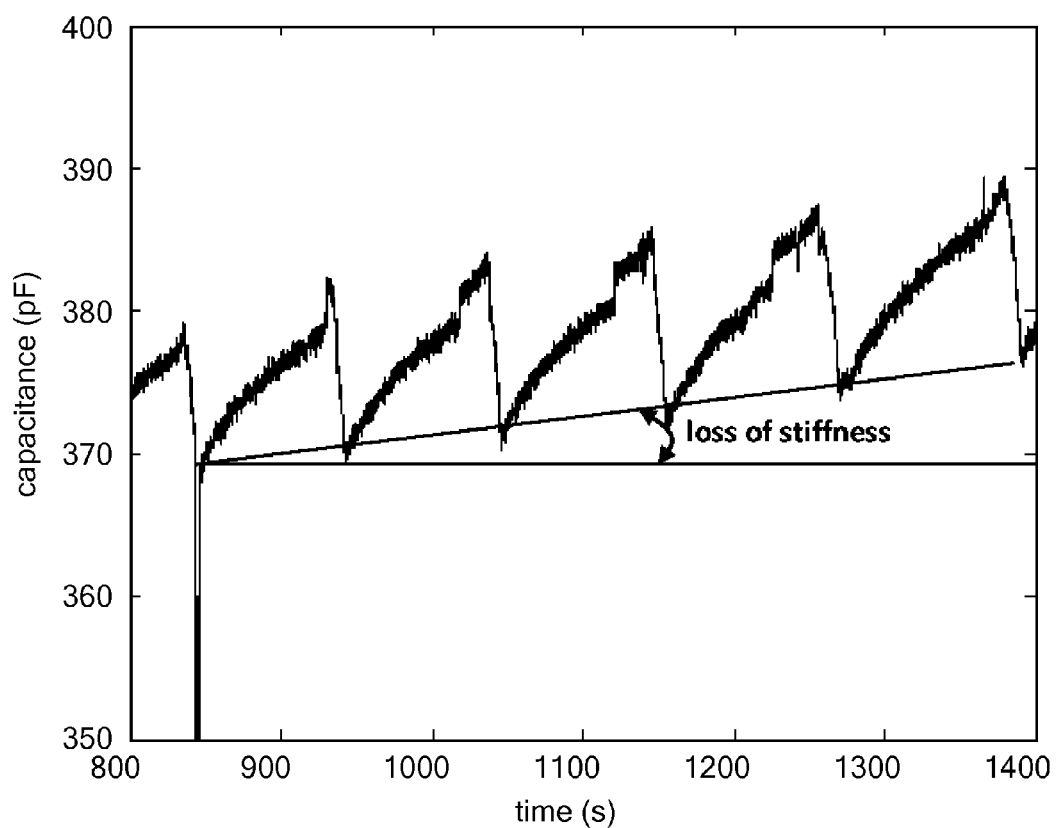
FIG. 10 is an enlargement of a further portion of the graph of FIG. 8.

In a first test, a single capacitive sensor assembly such as assembly 210 shown in FIG. 5 was attached to a lower surface of a beam. FIGS. 8 and 9 illustrate a significant jump in capacitance at the appearance of a first crack and as the crack widened, indicating that the capacitive sensor assembly is capable of detecting the formation of cracks. FIG. 9 is an enlargement of FIG. 8 between 240 and 380 seconds, illustrating with greater detail the change in capacitance. FIG. 10 illustrates an increase in capacitance over time, which correlates with a loss of stiffness of the beam.

Test 2

Figure 11:
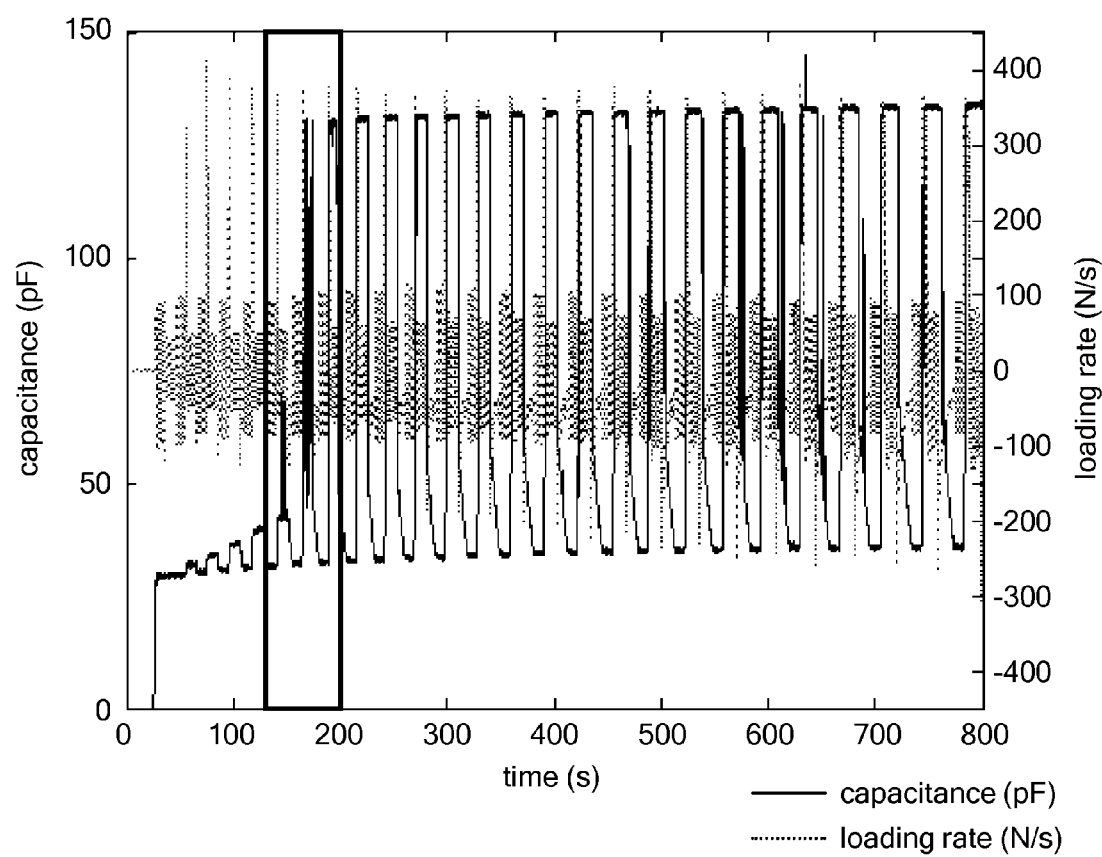
FIG. 11 is a graph of capacitance vs. time and loading rate vs. time in a second test of a capacitive sensor assembly.
Figure 12:
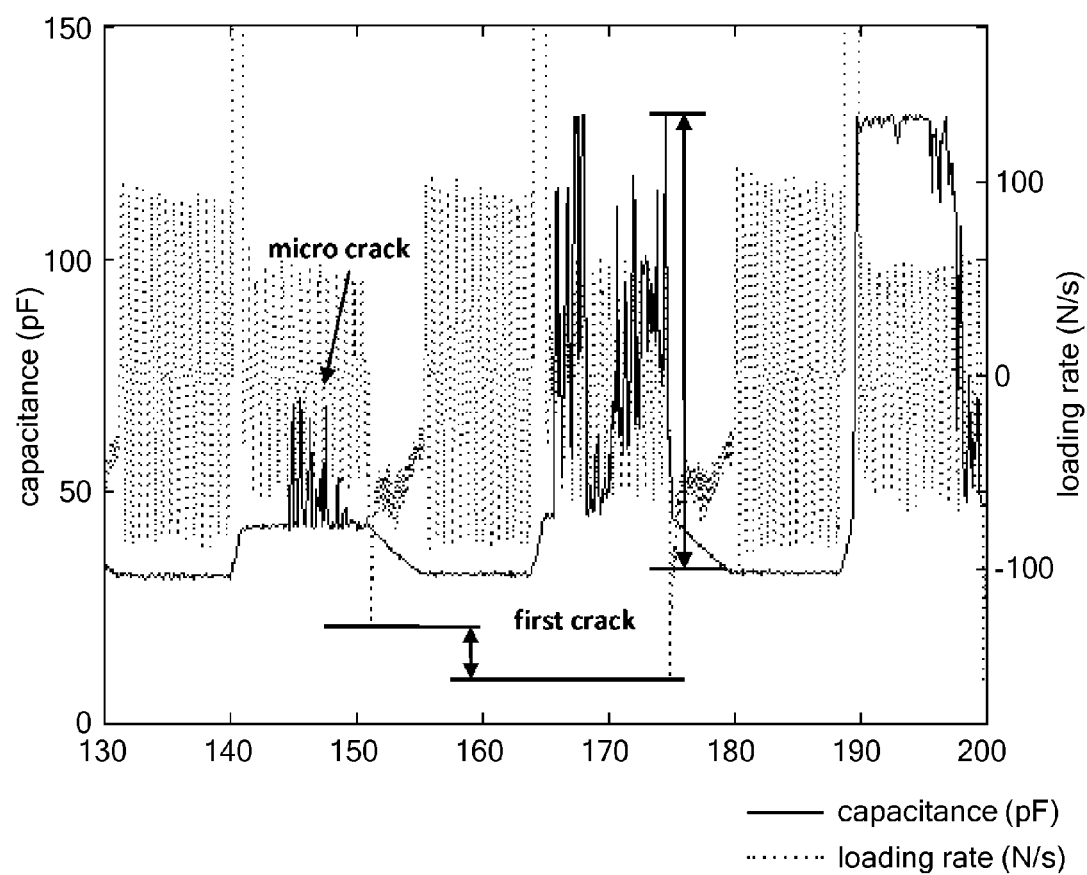
FIG. 12 is an enlargement of a portion of the graph of FIG. 11.

In a second test, a single capacitive sensor assembly such as assembly 210 of FIG. 5 was attached to a side surface of a beam. FIGS. 11 and 12 illustrate a change in capacitance at the appearance of a micro crack that closes back on itself with application and release of the load, and a larger change at the appearance of a crack. FIG. 11 is an enlargement of FIG. 12 between 130 and 200 seconds, illustrating with greater detail the change in capacitance.

Test 3

Figure 13:
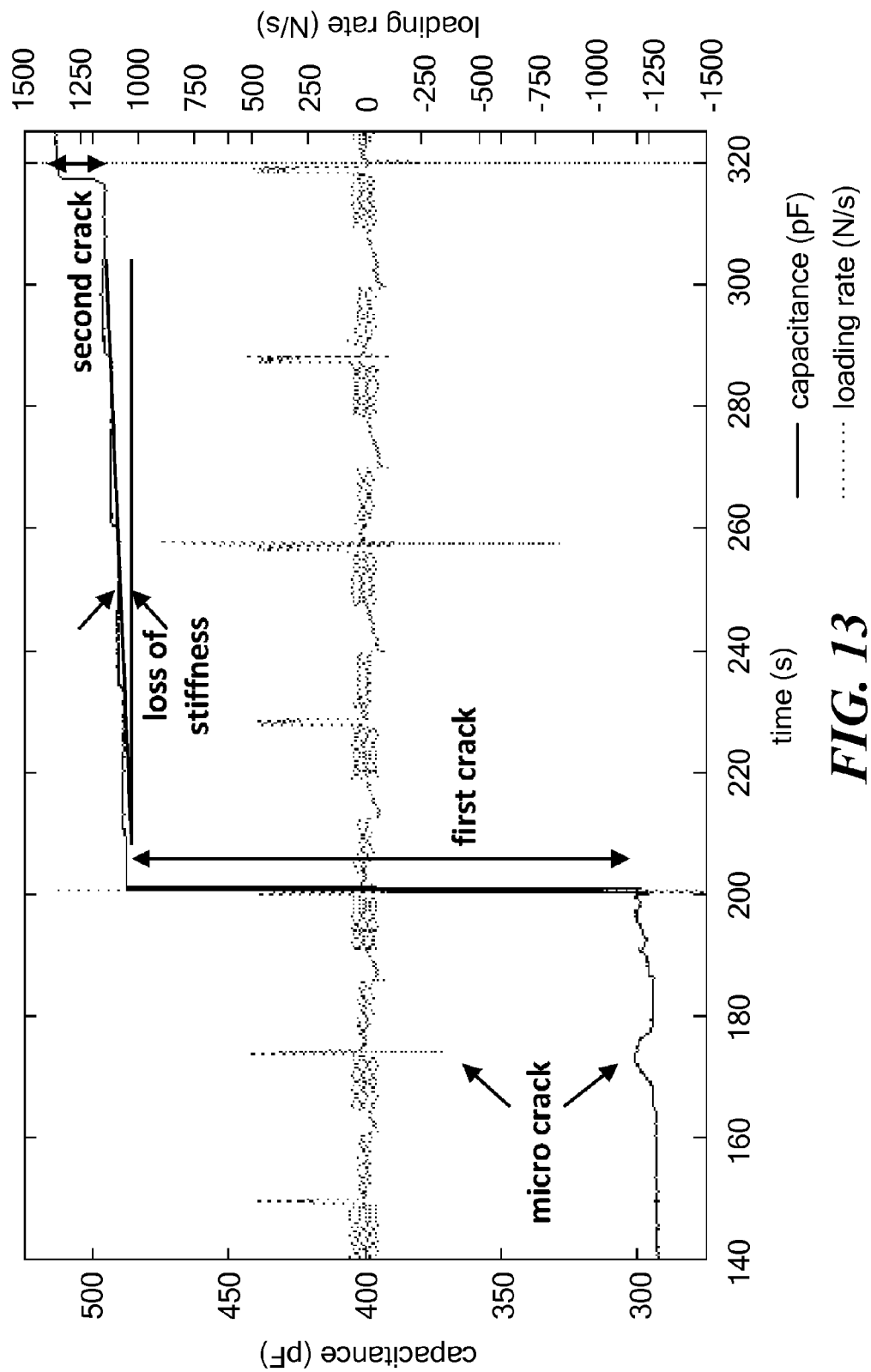
FIG. 13 is a graph of capacitance vs. time and loading rate vs. time in a third test of a capacitive sensor assembly.

In a third test, a differential capacitive sensor assembly such as assembly 210 in FIG. 5 was attached to a lower surface of a beam. FIG. 13 illustrates a change in capacitance at the appearance of a micro crack, at the appearance of a first crack, and at the appearance of a second crack. FIG. 13 also indicates an increase in capacitance correlated with a loss of stiffness of the beam.

The present structural health monitoring system is useful for the detection and localization of cracks in buildings and infrastructure, an area not well served by prior art systems and techniques in the field of structural health monitoring. The present system is non-destructive and can be readily applied to the surfaces of structural elements, including surfaces that are uneven and irregular, such as concrete and corroded steel. The system is capable of detecting the formation of cracks due to flexural, shear, torsional, and/or axial stresses on the structural element. Installation is relatively simple, resulting in cost and time savings over prior art techniques. The capacitive sensor assemblies can be manufactured in large quantities at low cost, which makes the system useful for large-scale structures such as civil structures: the application of small, discrete capacitive sensor assemblies in larger quantities at high densities over large areas also results in a higher damage localization accuracy. The materials used, such as silicone and silver metal, have a relatively low environmental impact. The system is safe, uses low voltage, and data can be collected online. The present system can result in an approach that provides low-cost, high-density monitoring of the static state of any civil structure or infrastructure.

In comparison, prior art pulse-echo, dynamic response, and acoustic emission techniques are temporary and localized, because of the technical constraints due to equipment limitations and costs. Thus, these prior art techniques cannot be implemented widely over a large-scale structure. Moreover, many applications remain at the laboratory level and there is yet a significant lack of field experimental data.

Prior art vibration-based techniques, such as the evaluation of a structure's vibration signature derived from accelerometers, have been shown to be efficient, but show a decreasing efficiency with an increased number of degrees of freedom, indeterminacy of the system, structural weights, and structural stiffnesses. Also localization of damage with such methods is complex. In contrast, with the present SHM system, damage localization is more readily achievable and can be implemented over a large area with multiple sensors.

Prior art fiber optic and smart memory alloy sensing can be efficient for damage localization, but these devices typically need to be embedded within a structural member, which makes the installation process costly and sensor replacement almost impossible. Also, embedded sensors may influence the structural integrity of the member and in some cases compromise it. The present SHM system employs sensors that do not need to be embedded, are simple to install, and can be readily replaced.

Piezoceramic sensors have been shown to be useful for localizing damages, but this monitoring technique requires many sensors for complete monitoring of a civil structure. Furthermore, if these sensors are bonded to the surface rather than embedded, the bonding surface may introduce impedance in the system, thus creating noisy data. Some piezoelectric sensors are brittle and cannot be used on uneven surfaces. The present SHM system can be bonded to uneven surfaces without adversely affecting operation of the system.

Piezoelectric wafer active sensors can be attached to the surface of or embedded within a structure and are able to emulate the pitch-catch, pulse-echo, and phased array evaluation methods. However, they are difficult to bond to the structure and their durability is not great. Piezoelectric paints have been developed, but can only measure dynamic strain, not static strain, whereas the present SHM system is capable of measuring static strain.

Polyvinylidene fluoride (PVDF) has been used as a dynamic strain gauge. However, this material is sensitive to the bond with the structural surface due to the nature of the dynamic signal, has low durability, and large power and voltage requirements.

The measurements of dynamic strains require constant measurements, and generally give global information on structural health. The present system, in contrast, is capable of static strain measurement over a large surface due to the low power requirement of capacitance measurements. The liquid epoxy is sufficient to properly bond the materials to a rough surface, such as concrete, as shear lag is not of concern when measuring static or quasi-static changes.

The invention is not to be limited by what has been particularly shown and described, except as indicated by the appended claims.

What is claimed is:

1. A structural health monitoring system comprising:
    a capacitive sensing assembly comprising at least a first capacitor and a bonding layer disposed to bond the first capacitor to a surface of a structural element, the first capacitor comprising:
        a compliant dielectric layer comprising a soft dielectric material having a first surface and a second surface, a thickness defined between the first surface and the second surface, a deformation of the soft dielectric material producing a change in capacitance, and
        a pair of electrodes disposed in opposition on the first and second surfaces of the soft dielectric material, and
    a measurement system in communication with the capacitive sensing assembly to receive signals representative of capacitance, the measurement system including a processor configured to determine a presence of a crack in the structural element from a change in capacitance over time of the capacitive sensing assembly.

2. The system of claim 1, wherein the soft dielectric material is comprised of a dielectric polymer material.

3. The system of claim 2, wherein the dielectric polymer material is comprised of a silicone elastomer.

4. The system of claim 2, wherein the dielectric electroactive polymer material is comprised of a polydimethylsiloxane.

5. The system of claim 1, wherein the electrodes are configured to operate in conjunction with the compliancy of the soft dielectric material.

6. The system of claim 1, wherein the first surface and the second surface of the compliant dielectric layer are corrugated, and the electrode comprise a film of metal deposited on the first surface and the second surface.

7. The system of claim 1, wherein the electrodes are comprised of a conductive metal.

8. The system of claim 1, wherein the capacitive sensing assembly comprises a second capacitor, the first capacitor comprising a sense capacitor, and the second capacitor comprising a reference capacitor;
   wherein the second capacitor further comprises a compliant dielectric layer comprising a soft dielectric material having a first surface and a second surface, a thickness defined between the first surface and the second surface, a deformation of the soft dielectric material producing a measurable change in capacitance, and a pair of electrodes disposed in opposition on the first and second surfaces of the soft dielectric material; and
   the measurement system is in communication with the first capacitor and the second capacitor to compare differences in capacitances between the first capacitor and the second capacitor.

9. The system of claim 8, wherein the first capacitor and the second capacitor are laminated together in a unitary layered structure.

10. The system of claim 9, further comprising an adhesive layer between the first capacitor and the second capacitor, the adhesive layer comprising an adhesive having a slow viscoelastic behavior relative to the soft dielectric material.

11. The system of claim 1, wherein the bonding layer is comprised of a liquid epoxy adhesive.

12. The system of claim 1, wherein the capacitive sensing assembly comprises a plurality of additional capacitors, the first capacitor and the additional capacitors disposed over an area of the surface of the structural element, each of the additional capacitors comprising:
   a compliant dielectric layer comprising a soft dielectric material having a first surface and a second surface, a thickness defined between the first surface and the second surface, a deformation of the soft dielectric material producing a measurable change in capacitance, and
   a pair of electrodes disposed in opposition on the first and second surfaces of the soft dielectric material, and
   the measurement system is in communication with each of the first capacitor and the additional capacitors, and operative to localize a crack in the structural element based on received signals representative of the capacitances.

13. The system of claim 1, wherein the soft dielectric material is formed as a sheet, and the capacitive sensing assembly comprises a plurality of additional capacitors formed on the sheet of the soft dielectric material, and
   the measurement system is in communication with each of the first capacitor and the additional capacitors, and operative to detect and localize a crack in the structural element based on received signals representative of the capacitances.

14. The system of claim 1, further comprising a liquid crystal polymer in the compliant dielectric layer and configured to provide an optical indication of mechanical stress.

15. A method of monitoring the health of a civil structure or infrastructure, comprising:
   providing the structural health monitoring system of claim 1;
   disposing the capacitive sensing assembly on a surface of a structural element;
   transmitting signals representative of capacitance measurements from the capacitive sensing assembly to the measurement system;
   determining a presence of a crack in the structural element from the capacitance measurements over time.

16. The method of claim 15, wherein the step of determining the presence of a crack comprises detecting a formation of a crack or a widening of a crack in the structural element.

17. The method of claim 15, wherein the structural health monitoring system comprises a plurality of additional capacitors disposed over an area of the surface of the structural element; and
   wherein the step of determining the presence of a crack comprises localizing a crack in the structural element based on a comparison of received signals from the first capacitor and the additional capacitors.

* * * * *